United States Patent [19]

Miyazawa et al.

[11] Patent Number: 4,816,181
[45] Date of Patent: Mar. 28, 1989

[54] LIQUID CRYSTAL CARBONATOBENZOIC ACID DERIVATIVE AND COMPOSITION

[75] Inventors: Kazutoshi Miyazawa; Shinichi Saito; Hiromichi Inoue; Takashi Inukai; Kanetsugu Terashima, all of Yokohamashi, Japan

[73] Assignee: Chisso Corporation, Tokyo, Japan

[21] Appl. No.: 900,812

[22] Filed: Aug. 27, 1986

[30] Foreign Application Priority Data

Aug. 27, 1985 [JP] Japan .................................. 60-187982

[51] Int. Cl.[4] ...................... C09K 19/12; C09K 19/20; G02F 1/13; C07C 69/96
[52] U.S. Cl. .......................... 252/299.65; 252/299.67; 252/299.01; 350/350 S; 558/273
[58] Field of Search ...................... 252/299.67, 299.65, 252/299.01; 350/350 S; 558/273

[56] References Cited

U.S. PATENT DOCUMENTS

| | | | |
|---|---|---|---|
| 4,576,732 | 3/1986 | Isogai et al. | 252/299.65 |
| 4,589,996 | 5/1986 | Inoue et al. | 252/299.65 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,647,398 | 3/1987 | Saito et al. | 252/299.65 |
| 4,728,458 | 3/1988 | Higuchi et al. | 252/299.65 |
| 4,759,869 | 7/1988 | Ohno et al. | 252/299.67 |

FOREIGN PATENT DOCUMENTS

| | | | |
|---|---|---|---|
| 164814 | 12/1985 | European Pat. Off. | 252/299.65 |
| 191600 | 8/1986 | European Pat. Off. | 252/299.65 |
| 61-22051 | 1/1986 | Japan | 252/299.65 |

OTHER PUBLICATIONS

Goodby et al, Liquid Crystals & Ordered Fluids, vol. 4, pp. 1–32 (1984).

*Primary Examiner*—Teddy S. Gron
*Assistant Examiner*—J. E. Thomas
*Attorney, Agent, or Firm*—Wenderoth, Lind & Ponack

[57] ABSTRACT

An optically active liquid crystal compound having a large spontaneous polarization value and a chiral smectic liquid crystal composition containing the same are provided, which compound is expressed by the formula

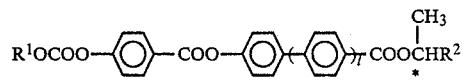

wherein $R^1$ and $R^2$ each represent an alkyl group of 4 to 18 carbon atoms and l represents 1 or 0.

3 Claims, No Drawings

LIQUID CRYSTAL CARBONATOBENZOIC ACID DERIVATIVE AND COMPOSITION

BACKGROUND OF THE INVENTION

1. Field of the Invention

This invention relates to novel liquid crystal compounds and a liquid crystal composition containing the same. More particularly it relates to chiral liquid crystal compounds having an optically active group and a chiral liquid crystal composition containing the same.

2. Description of the Related Art

As liquid crystal display elements, those of TN (Twisted Nematic) type display mode have currently been most broadly used, but they have been inferior to emissive type display elements (such as those of electroluminescence, plasma display, etc.) in the aspect of response speed. Thus, various improvements in this respect have been attempted, but it does not appear that the improvement to a large extent has been achieved. Accordingly, various liquid crystal display devices based on other principles in place of TN type display elements have been attempted, and as one of such devices, there is a display mode utilizing ferroelectric liquid crystals (N.A. Clark et al, Applied Phys. Letter, 36, 899 (1980)). This mode utilizes the chiral smectic C phase (hereinafter abbreviated to SC* phase) or chiral smectic H phase (hereinafter abbreviated to SH* phase) of ferroelectric liquid crystals, and those having these phases in the vicinity of room temperature are preferred.

Some liquid crystal compounds exhibiting chiral smectic phases have already been known for example, those of carbonic acid esters disclosed in Japanese patent application laid-open No. Sho 60-54341/1985, that is, those expressed by the formula

wherein R represents a linear chain or branched alkyl group of 1 to 18 carbon atoms; l represents 0 or 1; m represents 1 when l=0, and represents 1 or 2 when l=1; X represents COO or —O— when m=1 and represents a single bond when m=2; and * represents an optically active carbon, but there has still been no compound exhibiting satisfactory properties.

SUMMARY OF THE INVENTION

Mainly in order to develop a liquid crystal substance which is suitable for being applied to the above display mode has superior properties, particularly a large spontaneous polarization value, the present inventors have made extensive research on various liquid crystal substances having an optionally active group, and as a result have attained the present invention.

The present invention reside in an optically active liquid crystal compound expressed by the formula

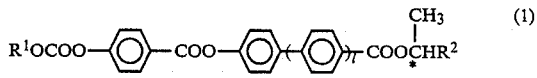

wherein $R^1$ and $R^2$ each represent an alkyl group of 4 to 18 carbon atoms and l represents 1 or 0, and a liquid crystal composition containing at least one kind of the compounds of the formula (I).

DETAILED DESCRIPTION OF PREFERRED EMBODIMENTS

The phase transition points of representatives of the compounds of the formula (I) are shown in Table 1.

Further, the spontaneous polarization values of a part of the compounds are shown in Table 2.

TABLE 1

| Sample No. | In formula (I) $R^1$ | $R^2$ | l | Phase transition point (°C.) C | SX*[(1)] | SC* | SA | I | Note |
|---|---|---|---|---|---|---|---|---|---|
| 1 | $C_5H_{11}$ | $C_6H_{13}$ | 0 | . −8.0 | — | — | — | . | |
| 2 | $C_7H_{15}$ | $C_6H_{13}$ | 0 | . 19.0 | — | — | — | . | |
| 3 | $C_8H_{17}$ | $C_6H_{13}$ | 0 | . 33.0 | — | — | — | . | Ex. 2 |
| 4 | $C_9H_{19}$ | $C_6H_{13}$ | 0 | . 36.0 | — | — | — | . | |
| 5 | $C_{12}H_{25}$ | $C_6H_{13}$ | 0 | . 37.5 | — | — | — | . | |
| 6 | $C_5H_{11}$ | $C_6H_{13}$ | 1 | . 88.7 | — | — | . 108.6 | . | |
| 7 | $C_7H_{15}$ | $C_6H_{13}$ | 1 | . 48.5 | — | . 62.0 | . 109.3 | . | |
| 8 | $C_8H_{17}$ | $C_6H_{13}$ | 1 | . 48.9 | — | . 76.5 | . 107.4 | . | Ex. 1 |
| 9 | $C_9H_{19}$ | $C_6H_{13}$ | 1 | . 45.0 | . 54.5 | . 89.4 | . 107.4 | . | |
| 10 | $C_{12}H_{25}$ | $C_6H_{13}$ | 1 | . 51.0 | . 54.7 | . 97.8 | . 106.7 | . | |

[(1)]SX*: unidentified smectic modification

TABLE 2

| (Note 1) Sample No. | (Note 2) Spontaneous polarization (nC/cm$^2$) |
|---|---|
| 3 | 18.9 (Note 3) Extrapolation value |
| 7 | 47.2 |
| 8 | 54.3 |
| 9 | 50.0 |
| 10 | 50.0 |

(Note 1): Sample Nos. are the same as those in Table 1.
(Note 2): Values measured at a temperature lower by 10° C. than the upper limit temperature of SC* phase.
(Note 3): The extrapolation value refers to a value obtained by mixing 20% by weight of the sample in a compound having SC* phase in the form of a single compound.

Among the compounds expressed by the formula (1), most of those of the formula (I) wherein l represents 1, singly exhibit smectic C phase and have a much larger spontaneous polarization (PS) value than those of so far known SC* phase compounds, and the compounds may be a superior ferroelectric liquid crystal compound. Some of the compounds of the formula (I) of the present invention have a PS value amounting to about 54.3 nC/cm$^2$. It can be said that the PS values of the present invention are far superior when the above value is compared with, e.g. the PS value (about 1 nC/cm$^2$) of a compound

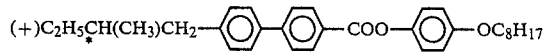

disclosed in Japanese patent application laid-open No. Sho 53-22883/1978. Further, as shown in Table 1, the compounds of the formula (I) wherein l=b 0 are preferred in that they have low melting points, but no smectic C* phase is observed in the form of a single compound. However, when the compounds are blended in the form of a single compound with a substance exhibiting SC* phase, they contribute to the value of spontaneous polarization of the resulting composition; hence it can be said that they potentially have ferroelectric properties.

Further, one of the superior specific features of the compounds of the formula (I) of the present invention is that the SC* phase thereof has a low viscosity. In the case of the SC* liquid crystal composition, it is a very important factor for reducing the response time that the composition has a low viscosity along with a large spontaneous polarization value. Thus, the above specific feature is very useful for the compound used as a component of the SC* liquid crystal composition.

When the light-switching effect of SC* phase is applied to display elements, the elements have the following three superior specific features as compared with those of TN display mode:

The first specific feature is that the display elements reply at a very high rate so that the response time is 1/100 or less of those of conventional TN mode display elements. The second specific feature is that there is a memory effect so that the multiplex drive is easy in combination thereof with the above high rate response properties. The third specific feature is that when the gray scale is given in the case of TN display mode, this is effected by adjusting the impressed voltage, but there are raised difficult problems such as temperature dependency of threshold voltage, voltage dependency of response rate, etc.; whereas when the light-switching effect of SC* phase is applied, it is possible to readily obtain th gray scale by adjusting the reverse time of polarity and hence the display elements are very suitable to graphic display.

As to the display method, the following two may be considered:

One method is of birefringence type using two plates of polarizers and another is of guest-host type using a dichlroic dyestuff. Since SC* phase has a spontaneous polarization, the molecule is reversed around the helical axis as a rotating axis by reversing the polarity of impressed voltage. When a liquid crystal composition having SC* phase is filled in a liquid crystal display cell subjected to aligning treatment so that the liquid crystal molecules can be aligned in parallel to the electrode surface, followed by placing the liquid crystal cell between two plates of polarizers arranged so that the director of the liquid crystal molecules can be in parallel to the polarization plane on one side, impressing a voltage and reversing the polarity, then a bright field of view and a dark field of view are obtained depending on the opposition angle of the polarizers. On the other hand, in the case of operation by way of the guest-host type, it is possible to obtain a bright field of view and a colored field of view (depending on the arrangement of the polarization plate), by reversing the polarity of impressed voltage.

Since the compound of the formula (I) also has an optically active carbon atom, it has a capability of inducing a twisted structure when it is added to nematic liquid crystals. Nematic liquid crystals having a twisted structure i.e. chiral nematic liquid crystals do not form the so-called reverse domain of TN type display elements; hence it is possible to use the compound of the formula (I) as an agent for preventing the reverse domain from forming.

In addition, racemic substances corresponding to the compound of the formula (I) may be similarly prepared by replacing an optically active alcohol by the corresponding racemic type alcohol in the preparation of an optically active substance (I) shown later, and the resulting substances exhibit almost the same phase transition points as those of the compound of the formula (I).

Further, among optically active alkanols as the raw material, S(+)-2-octanol and R(−)-2-octanol are commercially available, but other optically active alkanols are at present so expensive that they are unsuitable for use in a large quantity. Thus, the present inventors have used as raw material, products obtained by subjecting racemic substances to optical resolution according to the method described in a literature (R.H. Picard et al, J. Chem. Soc., 99, 45 (1911)), and by using the resulting optically active alkanols, it is possible to obtain various compounds of the formula (I) in which $R^2$ is varied. However, change in the phase transition point of liquid crystals due to the chain length of $R^2$ is slight; hence use as raw material, of optically active alkanols other than most readily available 2-octanols has no particular advantage.

The compounds of the formula (I) of the present invention may be prepared through the following passageways:

(i)

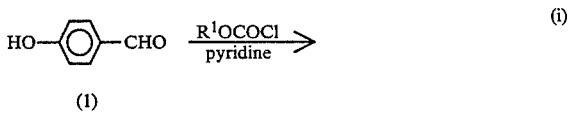

(1)

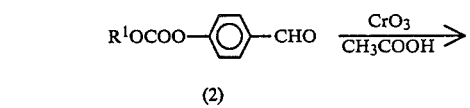

(2)

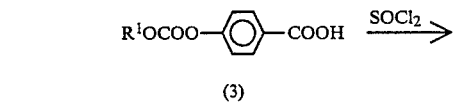

(3)

(4)

(ii)

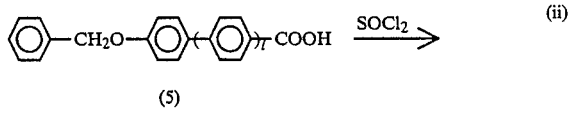

(5)

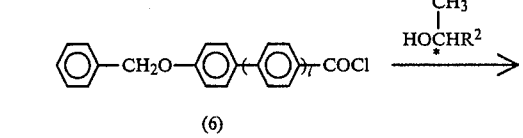

(6)

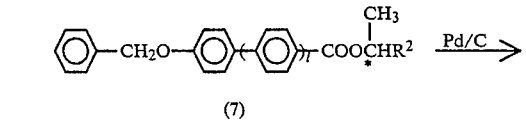

(7)

-continued

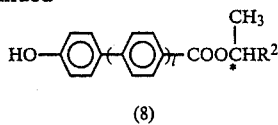

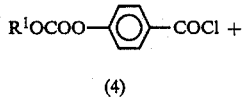

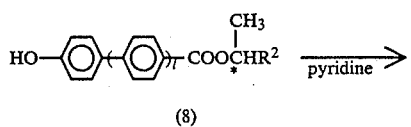

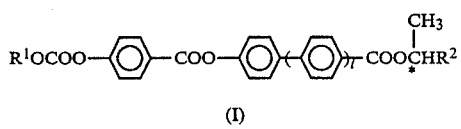

Namely, an alkyl chloroformate is reacted with 4-hydroxybenzaldehyde (1) in a basic solvent such as pyridine to obtain a 4-alkyloxycarbonyloxybenzaldehyde (2), oxidizing this aldehyde with an oxidizing agent such as chromium oxide to obtain a 4-alkyloxycarbonyloxybenzoic acid (3) which is then converted into a 4-alkyloxycarbonyloxybenzoic chloride (4) with thionyl chloride.

On the other hand, 4-benzyloxybenzoic acid or 4-benzyloxybiphenyl-4-carboxylic acid (5) is converted with $SOCl_2$ into 4-benzyloxybenzoic chloride or 4'-benzyloxybiphenyl-4-carboxylic chloride (6), followed by reacting an optically active 1-methyl-alkanol with the chloride, to obtain an optically active 4-benzyloxybenzoic acid 1-methyl-alkyl ester or an optically active 4'-benzyloxybiphenyl-4-carboxylic acid 1-methyl-alkyl ester (7), reducing this ester with a catalyst such as Pd/C, to obtain an optically active 4-(1-methylalkyloxycarbonyl)phenol or an optically active 4'-hydroxy-4-(1-methylalkyloxycarbonyl)biphenyl (8).

Next, the compound (4) is reacted with the compound (8) in a basic solvent such as pyridine to obtain an objective optically active 4-alkyloxycarbonyloxybenzoic acid 4-(1-methylalkyloxycarbonyl)phenyl ester (a compound of the formula (I) wherein l=0) or 4-alkyloxycarbonyloxybenzoic acid 4'-(1-methylalkyloxycarbonyl)-4-biphenyl ester (a compound of the formula (I) wherein l=1).

The optically active ester liquid crystal compound of the present invention will be described in more detail by way of Examples.

In addition, only optically active S type alcohols were used as a raw material in Examples, but even when optically active R type alcohols are used as a raw material, compounds having the same phase transition points of those of compounds derived from S type alcohols are obtained. This is theoretically natural. However, as to angle of rotation, helical twist sense and spontaneous polarization sense, those of R type compounds are contrary to those of S type compounds.

EXAMPLE 1

Preparation of optically active 4-octyloxycarbonyloxybenzoic acid 4'-(1-methylheptyloxycarbonyl)-4-biphenyl ester
(a compound of the formula (I) wherein $R^1=C_8H_{17}$, $R^2=C_6H_{13}$ and l=1; a compound of sample No. 8) (i) Preparation of 4'-hydroxy-4-(1-methyl-heptyloxycarbonyl)biphenyl Thionyl chloride (140 g, 1.18 mol) was added to 4'-benzyloxybiphenyl-4-carboxylic acid (300 g, 0.98 mol), followed by refluxing the mixture for about 2 hours, thereafter removing excess thionyl chloride under reduced pressure to obtain 4'-benzyloxybiphenyl-4-carboxylic chloride (295 g).

Next, S(+)-2-octanol (50 g, 0.38 mol) was dissolved in dry pyridine (150 ml), and to the solution was dropwise added under cooling, a solution of 4'-benzyloxybiphenyl-4-carboxylic chloride (112 g, 0.35 mol) dissolved in dry toluene (150 ml), followed by agitating the mixture at about 50°-60° C. for 2 hours, thereafter adding water (300 ml) and toluene (300 ml), agitating the mixture, washing the separated toluene layer with 6N-HCl, then with 2N-NaOH aqueous solution and further with water until the washing water became neutral, drying the toluene layer with anhydrous sodium sulfate and distilling off toluene to obtain 4'-benzyloxybiphenyl-4-carboxylic acid 1-methylheptyl ester (53 g), dissolving this ester (53 g, 0.13 mol) in ethanol (500 ml) and reducing it in the presence of palladium/carbon (Pd/C) 5 g) to obtain 4'-hydroxy-4-(1-methyl-heptyloxycarbonyl)biphenyl (34 g). (ii) Preparation of 4-octyloxycarbonyloxybenzoic chloride Commercially available 4-hydroxybenzaldehyde (17.8 g, 0.15 mol) was dissolved in dry pyridine (100 ml) and to the solution was dropwise added under cooling, octyl chloroformate (25 g, 0.13 mol), followed by agitating the mixture at 50°-60° C. for about 2 hours, adding water and toluene thereto, sufficiently agitating the mixture, washing the separated toluene layer with 6N-HCl, then 2N-NaOH aqueous solution and further with water until the washing water became neutral, drying the layer with anhydrous sodium sulfate and distilling off toluene to obtain 4-octyloxycarbonyloxybenzaldehyde (33 g, 0.12 mol), dissolving this compound (33 g, 0.12 mol) in acetic acid (90 ml), dropwise adding to the solution, a solution of chromium oxide (25.2 g, 0.25 mol) dissolved in acetic acid (30 ml) and water (20 ml), at about 20° C., heating the mixture up to 40° C., keeping it for 8 hours, placing water therein, filtering off deposited crystals, washing with water and recrystallizing from ethanol to obtain 4-octyloxycarbonyloxybenzoic acid (31 g), adding thereto thionyl chloride (20 g), refluxing the mixture for about 2 hours, and removing excess thionyl chloride under reduced pressure to obtain 4-octyloxycarbonyloxybenzoic chloride (30 g).

(iii) Preparation of the captioned compound 4'-Hydroxy-4-(1-methylheptyloxycarbonyl)biphenyl (10 g, 0.03 mol) obtained in the above paragraph (i) was dissolved in pyridine (70 ml), followed by dropwise adding to the solution, under cooling, 4-octyloxycarbonyloxybenzoic chloride (8.3 g, 0.028 mol) obtained in the above paragraph (ii), agitating the mixture at 50°-60° C. for 2 hours, placing water and toluene therein after completion of the reaction, sufficiently agitating the mixture, washing the separated toluene layer with 6N—HCl, then with 2N-NaOH aqueous solution, and further with water until the washing water became neutral, drying the toluene layer with anhydrous sodium sulfate, distilling off toluene to obtain an objective raw product, and recrystallizing it from ethanol to obtain the objective optically active 4-octyloxycarbonyloxybenzoic acid 4'-(1-methylheptyloxycarbonyl)-4-biphenyl ester (6.3 g). This product had a C-SC* point of 48.9° C., a SC*-SA point of 76.5° C. and a SA-I point of 107.4° C.

By replacing octyl chloroformate used above, by other alkyl chloroformates, various optically active 4-alkyloxycarbonyloxybenzoic acid 4'-(1-methylheptyloxycarbonyl)-4-biphenyl esters are obtained. The phase transition points and the spontaneous polarization values (PS) of these esters are shown in Tables 1 and 2.

EXAMPLE 2

Preparation of optically active 4-octyloxycarbonyloxybenzoic acid 4-(1-methylheptyloxycarbonyl)-phenyl ester (a compound of the formula (I) wherein $R^1 = -C_8H_{17}$, $R^2 = -C_6H_{13}$ and $l=0$; a compound of sample No. 3)

(i) Preparation of optically active 4-(1-methylheptyloxycarbonyl)phenol Thionyl chloride (140 g, 1.18 mol) was added to 4-benzyloxybenzoic acid (220 g, 0.98 mol), followed by refluxing the mixture for about 2 hours, thereafter removing excess thionyl chloride under reduced pressure to obtain 4-benzyloxybenzoic chloride (210 g).

Next, S(+)-2-octanol (50 g, 0.38 mol) was dissolved in dry pyridine (150 ml), followed by dropwise adding to the solution, under cooling, a solution of 4-benzyloxybenzoic chloride (86 g, 0.34 mol) obtained above, dissolved in dry toluene (150 ml), agitating the mixture at about 50°-60° C. for 2 hours, thereafter adding water (300 ml) and toluene (300 ml), agitating the mixture, washing the separated toluene layer with 6N-HCl, then with 2N-NaOH aqueous solution, further with water until the washing water became neutral, drying the resulting toluene layer with anhydrous sodium sulfate and distilling off toluene to obtain 4-benzyloxybenzoic acid 1-methylheptyl ester (51 g, 0.15 mol), which was then dissolved in ethanol (500 ml) and reduced in the presence of palladium-carbon (5g) to obtain optically active 4-(1-methylheptyloxycarbonyl)phenol (25 g).

(ii) Preparation of the captioned compound

Optically active 4-(1-methylheptyloxycarbonyl)-phenol (10 g, 0.04 mol) was dissolved in pyridine (70 ml), followed by dropwise adding to the solution, under cooling, 4-octyloxycarbonyloxybenzoic chloride (11.4 g, 0.035 mol) prepared in the same manner as in the paragraph (ii) of Example 1, agitating the mixture at 50°-60° C. for 2 hours, placing water and toluene in the reaction solution after completion of the reaction, sufficiently agitating the mixture, washing the separated toluene layer with 6N—HCl, then with 2N-NaOH aqueous solution, further with water until the washing water became neutral, drying the resulting toluene layer with anhydrous sodium sulfate, distilling off toluene to obtain a raw objective product, and recrystallizing this product from ethanol to obtain optically active 4-octyloxycarbonyloxybenzoic acid 4-(1-methylheptyloxycarbonyl)phenyl ester (5.2 g), which exhibited no liquid crystal phase and had a m.p. of 33.0° C. Further, by replacing octyl chloroformate used, by other alkyl chloroformates, various optically active 4-alkyloxycarbonyloxybenzoic acid 4-(1-methyl-heptyloxycarbonyl)-phenyl esters are obtained. The phase transition points thereof are shown in Tables 1 and 2.

EXAMPLE 3 (Use example 1)

A nematic liquid crystal composition consisting of

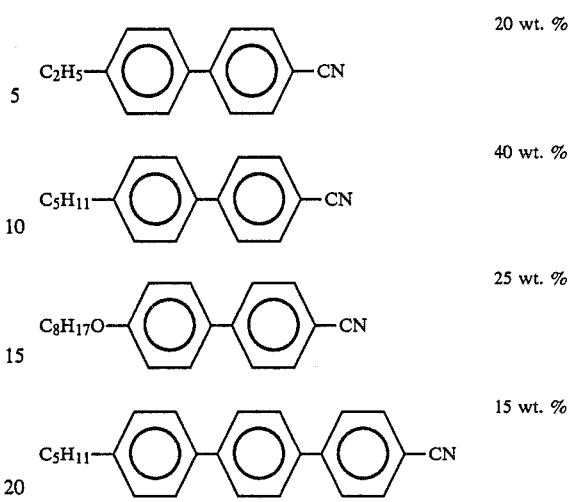

was sealed in a cell provided with transparent electrodes each having polyvinyl alcohol (PVA) as an aligning agent applied onto the surface thereof and further having the resulting surface subjected to rubbing for parallel aligning treatment, and having a distance of 10 μm between the electrodes to prepare a TN cell, which was then observed under a polarizing microscope. As a result, a reverse twist domain was observed to be formed.

To the above nematic liquid crystal composition was added a compound of the formula (I) of the present invention wherein $R^1 = C_8H_{17}-$, $R^2 = -C_6H_{13}$ and $l=0$, i.e. a compound of sample No. 3, in a quantity of 0.1% by weight, and the resulting composition was sealed in the same cell as above and the TN type cell was similarly observed. As a result, the reverse twist domain was dissolved and a uniform nematic phase was observed.

EXAMPLE 4 (Use example 2)

A liquid crystal composition consisting of the following components and containing as a component, the optically active liquid crystal compound of sample No. 10 of the above Table 1 was prepared:

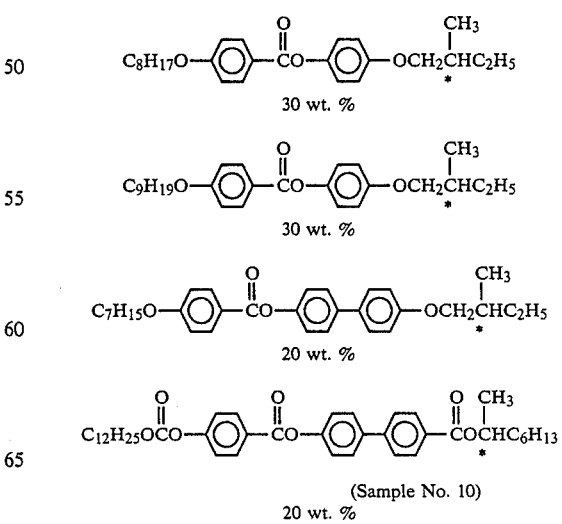

(Sample No. 10)

The preparation of the above composition was carried out by weighing the above four liquid crystal compounds each in a definite weight and blending the four compounds in a sample bottle while they are dissolved together on heating.

The resulting composition was sealed in a cell provided with transparent electrodes each having PVA applied onto the surface thereof and further having the resulting surface subjected to rubbing for parallel aligning treatment, and having a cell thickness of 2 μm. The resulting liquid crystal element was provided between two crossed sheets of polarizers and an electric field was impressed. As a result, by impressing 20 V, change in the intensity of transmitted light was observed. From the change in the intensity of transmitted light at that time was sought a response time, which exhibited a value of about 1.5 msec at 25° C.

In addition, as to the above liquid crystal composition, the temperature change of its texture was observed by means of a polarizing microscope. As a result, it was found that the composition formed a ferroelectric liquid crystal composition in the range of 20° C. to 60° C., and the value of its spontaneous polarization was 7 nC/cm$^2$ at 25° C. and the tilt angle was 22°.

What we claim is:

1. A compound of the formula

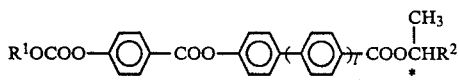

wherein $R^1$ represents an alkyl group of 7 to 12 carbon atoms, $R^2$ represents $C_6H_{13}$, and l represents 1.

2. A chiral smectic liquid crystal composition containing at least two components at least one of which is an optically active liquid crystal compound expressed by the formula as set forth in claim 1.

3. A light-switching element comprising a chiral smectic liquid crystal composition according to claim 2.

* * * * *